United States Patent [19]
Haradem

[11] Patent Number: 5,826,469
[45] Date of Patent: Oct. 27, 1998

[54] THREADING MACHINE COOLANT SYSTEM AND METHOD OF COOLING

[75] Inventor: Donald A. Haradem, Avon, Ohio

[73] Assignee: Emerson Electric Company, St. Louis, Mo.

[21] Appl. No.: 944,775

[22] Filed: Oct. 6, 1997

[51] Int. Cl.⁶ .................................................. B23G 1/02
[52] U.S. Cl. .............................. 82/1.11; 82/110; 408/56; 470/66
[58] Field of Search ............................ 82/1.11, 110, 111, 82/900, 901; 407/11; 408/56, 57, 60, 221; 470/66, 80

[56] References Cited

U.S. PATENT DOCUMENTS

| 384,762 | 6/1888 | Hay . |
| 710,184 | 9/1902 | Clements . |
| 1,196,572 | 8/1916 | Maynard . |
| 1,635,447 | 7/1927 | Vosper . |
| 1,701,154 | 2/1929 | Gunn . |
| 1,943,642 | 1/1934 | Vosper . |
| 1,947,874 | 2/1934 | Pealer . |
| 2,429,741 | 10/1947 | Barfels . |
| 2,929,566 | 3/1960 | Paasche . |
| 3,176,330 | 4/1965 | Jennings ..................................... 407/11 |
| 3,232,629 | 2/1966 | Obear . |
| 3,413,667 | 12/1968 | Behnke ...................................... 470/66 |
| 3,570,332 | 3/1971 | Beake . |
| 4,025,219 | 5/1977 | Baumann . |
| 4,613,260 | 9/1986 | Hayes et al. .............................. 408/74 |
| 4,657,068 | 4/1987 | Peltz .......................................... 408/56 |
| 4,787,531 | 11/1988 | Gress . |
| 4,811,639 | 3/1989 | Gress et al. ............................... 82/110 |
| 4,949,813 | 8/1990 | Kidder et al. ............................. 408/56 |
| 5,190,421 | 3/1993 | Wen et al. ................................. 408/56 |

Primary Examiner—Daniel W. Howell
Assistant Examiner—Toan Le
Attorney, Agent, or Firm—Vickers, Daniels & Young

[57] ABSTRACT

A power driven pipe threading machine is provided with a coolant system by which an oil free, glycol based coolant is dispensed onto the workpiece during thread cutting in the area thereof adjacent a thread cutting die at a rate which provides for the coolant to completely evaporate and for the workpiece to be cooled to a temperature which provides a good quality thread. The coolant is pumped from a reservoir to a coolant outlet on the die head of the machine and through a needle valve by which the discharge rate is adjustable, and a torque responsive shut-off valve is associated with the die head for controlling the flow of coolant from the reservoir to the needle valve and coolant outlet in response to initial threading engagement between the workpiece and cutting dies on the die head.

37 Claims, 5 Drawing Sheets 5,826,469

THREADING MACHINE COOLANT SYSTEM AND METHOD OF COOLING

BACKGROUND OF THE INVENTION

This invention relates to the art of power driven threading machines and, more particularly, to an improved arrangement and method for cooling a workpiece and thread cutting tools during a threading operation.

As is well known, a power driven threading machine includes a workpiece chuck mechanism for holding a workpiece to be threaded and which is rotated at a threading speed through a motor driven transmission. As is further well known, thread cutting dies are supported on a die head which in turn is supported on a tool carriage which is advanced axially inwardly of the outer end of the rotating workpiece to achieve the cutting of threads thereon. At the end of the thread cutting operation, the dies are either automatically or manually released from engagement with the workpiece and the carriage and die head are axially withdrawn therefrom. It is well known in connection with such operation of power driven threading machines to flood the area adjacent the point of contact between a workpiece and a thread cutting die with a petroleum based thread cutting oil for cooling the workpiece and dies during the cutting operation. Generally, the thread cutting oil is contained in a reservoir in the machine, usually located beneath the chuck and tool carriage area, and the oil is pumped to a nozzle or the like supported adjacent the workpiece and dies for directing cutting oil thereonto. The cutting oil discharged onto the workpiece and threading dies drops through a chip screen and is returned to the reservoir therebeneath, and the cutting oil is continuously circulated from the reservoir to the nozzle during operation of the machine by a pump driven thereby. In connection with recirculation, the oil flows through a filter in the reservoir for removal of chips, dirt and the like.

While the flooding of the working area with thread cutting oil serves the intended purpose of cooling the workpiece and tools during a thread cutting operation, there are a number of disadvantages attendant to the use of thread cutting oils and the necessary circulating systems therefor. In this respect, for example, oil is lost by splashing onto the machine parts and/or the floor by which the machine is supported, and the workpiece, dies, and machine parts adjacent the workstation such as the chuck mechanism and die head are all covered with a film of the oil at the end of a thread cutting operation. Accordingly, the handling of these components is messy as is the cleaning thereof which, additionally, is time consuming and results in non-productive time for the machine operator. Moreover, cleaning of the threads of the workpiece is made more difficult by the clinging of oil and chips thereto, again resulting in lost production time for the machine operator. Further, when it becomes necessary to clean the reservoir area, the latter operation is likewise messy, dirty and time consuming and, in connection with all of the foregoing cleaning operations, the use of a solvent is necessary if it is desired to completely remove the film residue resulting from the use of petroleum based coolants and lubricants. Moreover, while the oil reservoir is generally beneath a screen, as mentioned above, whereby large chips and turnings are precluded from entering the reservoir, small metal particles fall through the screen into the reservoir and are captured in the filter which must be cleaned periodically, thus increasing the nonproductive time of the operator. Still further, if the machine is to be transported and/or stored in any orientation other than horizontal, the reservoir has to be drained and wiped to avoid spillage of oil therefrom, again adding to the non-productivity of the operator.

SUMMARY OF THE INVENTION

The foregoing and other disadvantages attendant to the use heretofore of constantly recirculated petroleum based coolants and lubricants in connection with the operation of a power driven threading machine are advantageously minimized and/or avoided by an improved method for cooling a workpiece and threading dies and an improved coolant system for a threading machine provided in accordance with the present invention. More particularly in accordance with the invention, an oil free, substantially lubricant free, vaporizable coolant is dispensed onto the workpiece in an area thereof adjacent the point of contact between the workpiece and a cutting die at a rate which provides for the coolant to completely vaporize during threading engagement between the workpiece and dies. The coolant cools the workpiece and dies, and the rate of dispensing is controlled to maintain the cutting temperature within a selected temperature range which provides good thread quality. The latter is determined at least in part by a thread surface which is free of scaling and discoloration and wherein the thread form is round and there is no tearing on the thread crests and flanks which would affect sealing. Preferably, the coolant is glycol based and vaporization of the coolant provides for the thread cutting operation to be dry. Moreover, there is little or no residue left on the workpiece and no film of oil to which metal chips can cling and which must be removed by a solvent to obtain the same dry condition as is achieved with use of an oil free, volatile coolant in accordance with the present invention. Such evaporation also eliminates the return of coolant to the reservoir from which it is pumped to the thread cutting work area, whereby the reservoir can be isolated relative to the work area and defined, for example, by a refillable bottle located within the motor and spindle housing of the machine. The reservoir area heretofore required beneath the thread cutting work area can be replaced by a removable container into which the dry metal chips fall. Further advantage resides in the fact that the dispensing arrangement for pumping the coolant from the reservoir to the work area does not have to include a filter in that there is no recirculation of the coolant. Thus, the cost of the dispensing arrangement is reduced and maintenance time heretofore required for cleaning and/or replacement of the filter is eliminated. Preferably, the coolant is water soluble which simplifies clean-up following a thread cutting operation. Further in connection with such clean-up, since the accumulated metal chips are dry and there is no oily film on the workpiece or machine parts to be dealt with, clean-up is achieved faster than heretofore possible, whereby the productive time of a machine operator is advantageously increased.

Preferably, the coolant is pumped from the reservoir through a flow line having an outlet and a flow control valve arrangement including a pre-adjusted or an adjustable metering valve for adjusting the flow rate of coolant onto the workpiece in the area adjacent the point of engagement of a cutting die therewith. The coolant is pumped through the flow line by a pump driven through the threading machine transmission, whereby the pump is operable to pump the coolant from the reservoir in response to operation of the transmission to rotate a workpiece to be threaded. Preferably, the flow control valve arrangement includes a shut-off valve between the reservoir and the metering valve for controlling the flow of coolant from the reservoir to the point of discharge onto the workpiece. The shut-off valve advantageously provides selectivity with respect to controlling the flow of coolant from the reservoir to the point of discharge so as to avoid the dispensing of coolant onto the workpiece until the threading dies have engaged therewith to generate heat for vaporizing the coolant. While the shut-off valve could be manually operated for the latter purpose, it is preferred to incorporate such control with the manipulation of the thread cutting die head into its thread cutting disposition relative to a workpiece and in particular, into thread cutting interengagement of the dies with the rotating workpiece, whereby the torque imposed on the die head is operable to open the shut-off valve. Such control of the flow of coolant by the shut-off valve and such control of the operation of the shut-off valve advantageously avoids waste of the coolant. Thus, the flow of coolant across the metering valve for dispensing onto the workpiece is initiated in response to threading interengagement between the workpiece and thread cutting dies and is interrupted at the end of the thread cutting operation in response to release of the dies from engagement with the workpiece and, thus, removal of the torque from the die head.

The rate at which the coolant is dispensed onto the workpiece is dependant on a number of factors including the diameter of the workpiece being threaded, the threading or cutting speed, the desired cutting temperature resulting from use of the coolant, and the particular coolant being used. In connection with the diameter of the workpiece and the cutting speed, and assuming a given coolant and end temperature sought, a larger diameter workpiece will require the dispensing of more coolant than a smaller diameter workpiece in order to obtain the same end temperature. Further, the increased dispensing rate in the latter example can be reduced by reducing the cutting speed of the machine and, therefore, the torque and dry cutting or uncooled temperature of the workpiece. The latter, of course, requires that the threading machine have a variable speed drive, some of which but not all of which do. Still further, for a given size workpiece, given cutting speed and given end temperature sought, the dispensing rate of the coolant can vary from one coolant to another. Accordingly, it will be appreciated and understood that a coolant in accordance with the present invention is a liquid having a boiling point below the maximum temperature generated between a workpiece and thread cutting dies during thread cutting without coolant application, and that the amount of coolant to be dispensed onto the workpiece in the area thereof adjacent the point of contact between the workpiece and a thread cutting die is that required to lower the workpiece to a desired end temperature while providing for complete vaporization of the coolant and the cutting of good quality threads. Generally, the temperature generated during thread cutting interengagement between a workpiece and cutting dies, without coolant application, for workpieces varying in diameter from ½" to 3", and driven at standard cutting speeds for the various workpiece diameters, varies from about 300° F. to 600° F. for a ½" to 3" black or galvanized iron pipe. It is preferred that the end temperature resulting from the dispensing of coolant onto the workpiece in accordance with the present invention be no more than 230° F. and, preferably, be between about 190° F. to 220° F. which provides good quality threads as described above in addition to a workpiece temperature at which the workpiece can be comfortably handled after minimal cooling.

It is accordingly an outstanding object of the present invention to provide an improved method and system for cooling a workpiece and thread cutting dies of a power driven threading machine during a thread cutting operation.

Another object is the provision of an improved method and system of the foregoing character wherein an oil free, vaporizable coolant is dispensed onto a workpiece being threaded in an area adjacent the point of contact between the workpiece and a thread cutting die at a rate at which the coolant completely vaporizes and evaporates to cool the workpiece and cutting dies while producing good thread quality.

A further object is the provision of an improved method and system of the foregoing character wherein the coolant is consumed and the metal chips resulting from the threading operation are dry and thus more easily collectible and disposed of than heretofore possible.

Yet another object is the provision of an improved method and system of the foregoing character wherein the coolant supply system includes a coolant reservoir which is remotely located relative to the work area and in the form of a refillable receptacle which is closable to enable transportation and/or storage of the threading machine in a non-horizontal disposition without spillage of the coolant.

Yet a further object is the provision of an improved method and system of the foregoing character wherein delivery of the coolant from the reservoir to the point of dispensing onto the workpiece is controllable to enable precluding flow of the coolant onto the workpiece absent threading interengagement between the workpiece and thread cutting dies.

Still another object is the provision of an improved method and system of the foregoing character wherein the flow of coolant from the reservoir to the point of dispensing onto the workpiece is controlled by the position of the thread cutting die head relative to the workpiece and thread cutting interengagement between the workpiece and thread cutting dies.

A further object is the provision of an improved method and system of the foregoing character which optimizes the productive time of a machine operator in connection with use of the machine.

Another object is the provision of an improved method and system of the foregoing character which minimizes the time and effort required to clean threaded workpieces and the component parts of the threading machine following the performance of threading operations therewith.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which.

DESCRIPTION OF A PREFERRED EMBODIMENT

Figure 1:
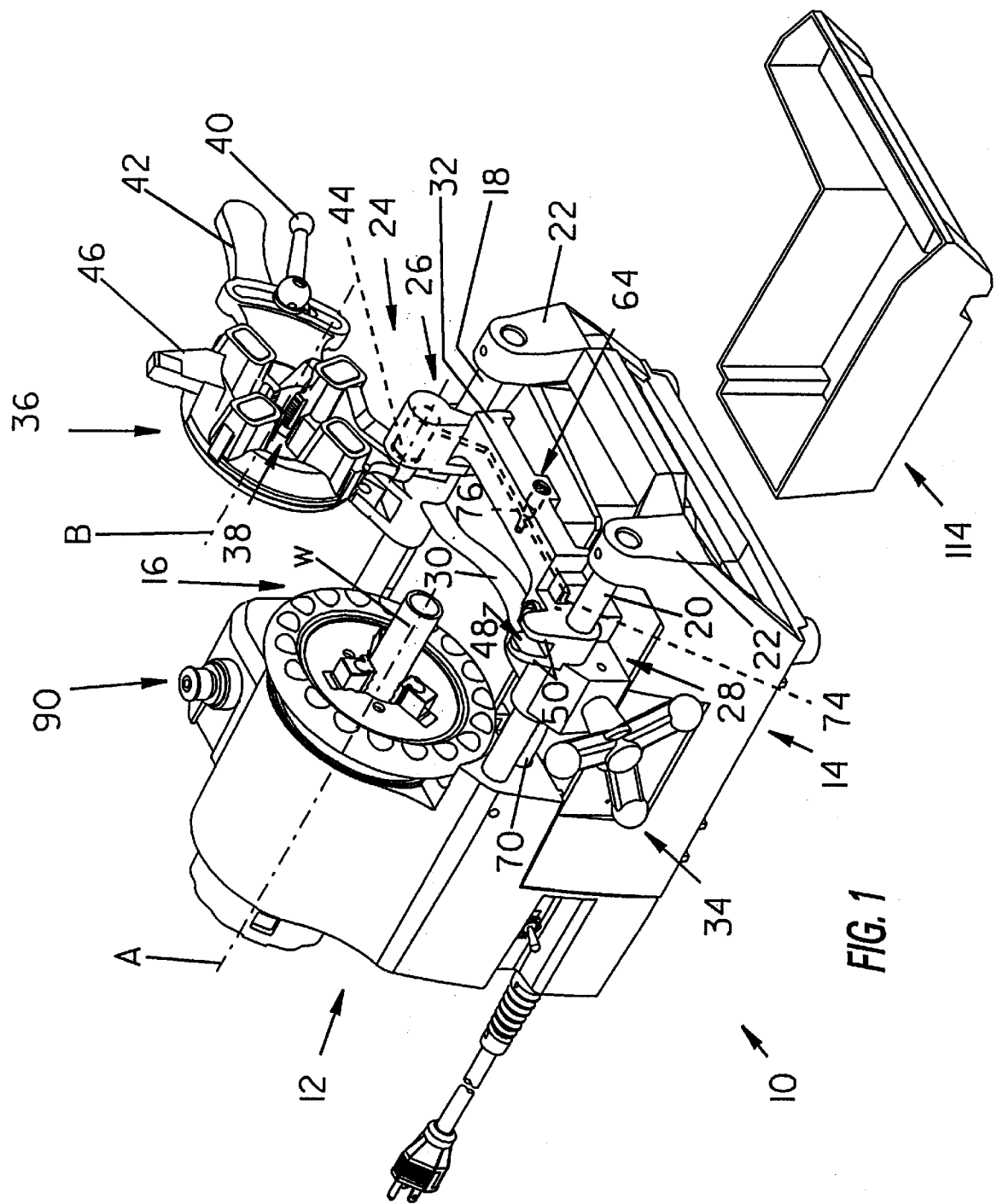
FIG. 1 is a perspective view of a thread cutting machine having a coolant system in accordance with the present invention and showing the die head of the machine in a non-use position.
Figure 2:
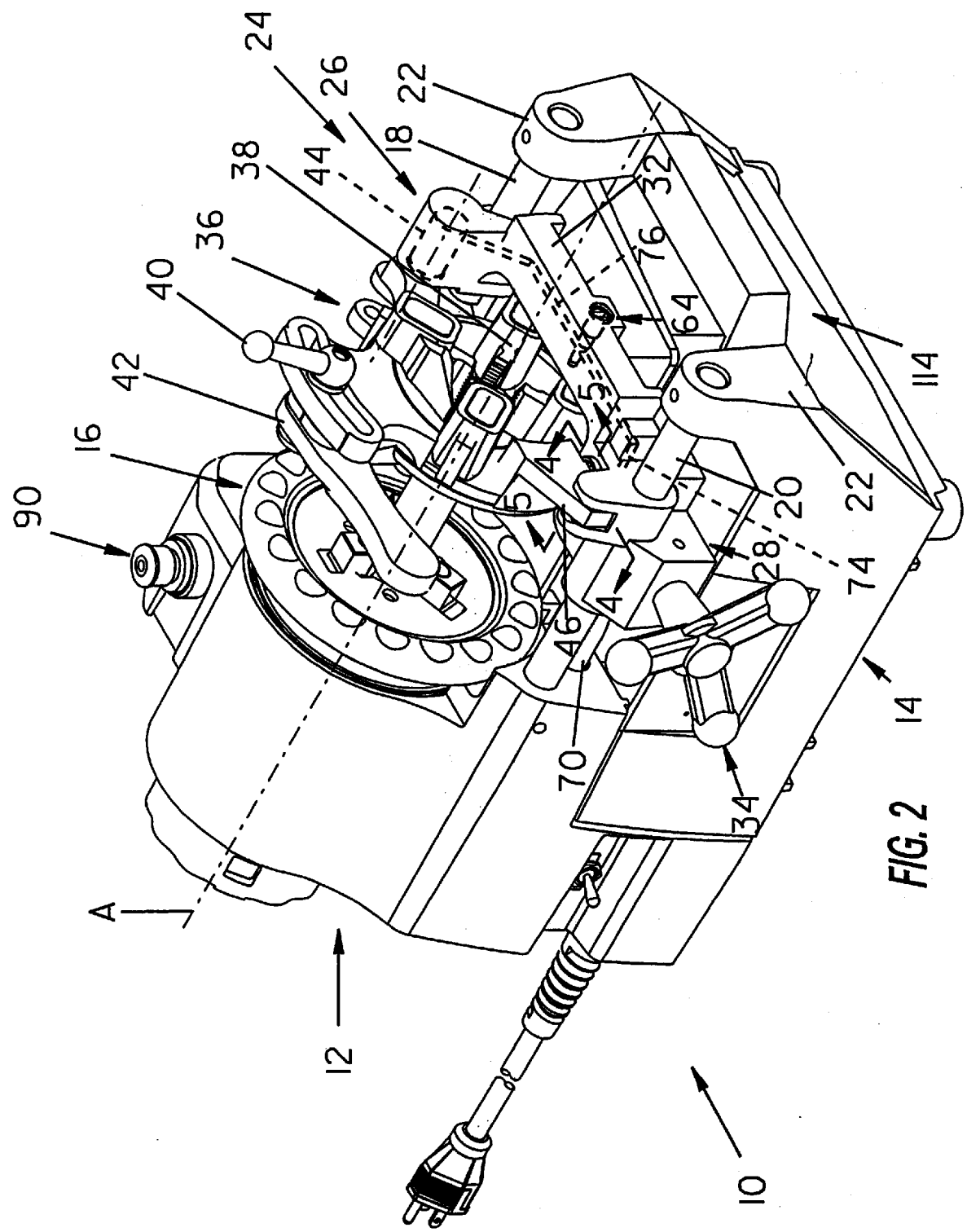
FIG. 2 is a perspective view similar to FIG. 1 and showing the die head in the use position thereof.

Referring now in greater detail to the drawings, wherein the showings are for the purpose of illustrating a preferred embodiment of the invention only, and not for the purpose of limiting the invention, FIGS. 1 and 2 illustrate a threading machine which, basically, comprises a base or support 10 which includes a spindle, motor and transmission housing portion 12 at one end and a tooling carriage support portion 14 at the other end. As is well known, a workpiece chuck assembly 16 is supported on housing portion 12 and is driven through the motor and transmission assembly housed in the latter to rotate a workpiece W about a machine axis A. A pair of laterally spaced apart tool carriage support rails 18 and 20 have inner ends received in and supported by housing portion 12 of support 10 and outer ends received in and supported by upwardly extending legs 22 of portion 14 of support 10. A tooling carriage 24 has laterally opposite sides 26 and 28 respectively slidably received on support rails 18 and 20, and sides 26 and 28 of the carriage are laterally interconnected by axially spaced apart cross members 30 and 32. In a well known manner, the underside of support rail 20 is provided with teeth, not shown, which engage a pinion supported in side 28 of the carriage and which is rotatable by means of an operating handle 34 to displace the tooling carriage in opposite directions along the support rails.

Figure 4:
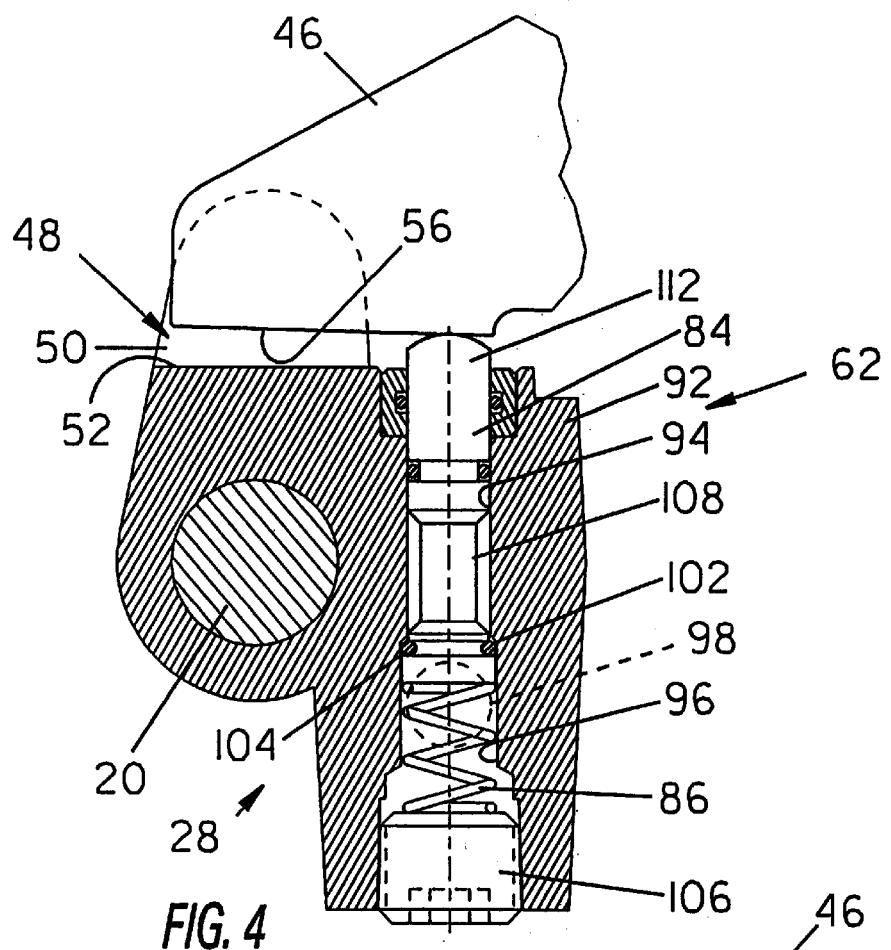
FIG. 4 is a sectional elevation view taken along line 4—4 in FIG. 2 and showing the shut-off valve closed and the position of the die head positioning lug relative to the shut-off valve just prior to initiating the thread cutting operation.

Side 26 of carriage 24 supports a thread cutting die head 36 for pivotal displacement relative thereto between a non-use or storage position shown in FIG. 1 and a use position shown in FIG. 2. In the latter position, thread cutting dies 38 on the die head are preliminarily positioned relative to workpiece W as described in greater detail hereinafter for cutting threads on the end of workpiece W when carriage 24 is displaced through operating handle 34 to move cutting dies 38 into engagement with the workpiece. While not shown, for purposes of clarity, carriage 24 can pivotally support other tools such as workpiece cutting and reaming tools which, like die head 36, are pivotal relative to the carriage between use and non-use positions. Die head 36 has an axis B and, as is well known in connection with die heads, includes a rotatable cam plate assembly, not shown, by which the positions of cutting dies 38 are radially adjustable relative to axis B to facilitate positioning the cutting dies in thread cutting positions which are determined by the diameter of a workpiece to be threaded. As is further well known, when the cutting positions are set the cam plate is rotatable between first and second positions in which the cutting dies are respectively in their working positions and in released positions in which the cutting dies are radially outwardly retracted into the die head so as to be out of contact with the workpiece. In the embodiment illustrated, the latter two functions are respectively achieved through a cam plate locking lever 40 and a cam plate positioning lever 42. With further regard to die head 36, the latter is pivotally mounted on side 26 of carriage 24 by means of a pin 44 extending into a bore 45 provided therefor in side 26 of the die head. In the use position of the die head, the latter is vertically supported by pin 44 on side 26 of the carriage and by a positioning lug 46 on the other side of the die head which engages in a positioning slot 48 provided on side 28 of the carriage by a pair of axially spaced apart upstanding projections 50. As best seen in FIG. 4, positioning slot 48 has a bottom wall 52 which extends laterally inwardly of carriage side 28, and the underside 56 of positioning lug 46 is a planar surface adapted to facially engage surface 52 when positioning lug 46 is fully seated in positioning slot 48 as shown in FIG. 6 set forth more fully hereinafter.

Generally, as mentioned hereinbefore, in cutting threads on galvanized iron, or black iron pipe having a diameter from ½" up to 3", a temperature of from about 300° F. to 600° F. is generated in the absence of the application of coolant to the workpiece and tooling during the cutting operation. If coolant is not provided, or is inadequate, the heat generated can result in distortion of the cut threads from round, discoloration and/or hardening of the metal from the heat, tearing of the outer ends of the threads and scaling of the thread surface. Additionally, such heat accelerates wearing of the thread cutting dies and thus shortens the life thereof as well as a further reducing the quality of cut threads as the wear progresses. In accordance with one aspect of the present invention, a volatile, oil free coolant which is substantially free of lubricant and, preferably, includes a synthetic lubricant amounting to 4% of the coolant composition is dispensed onto a workpiece and tooling during a threading operation at a rate which provides for the coolant to completely vaporize while reducing the temperature of the workpiece to a temperature which provides good thread quality as evidenced by a thread surface which is free of scaling and discoloration, wherein there is no tearing on the thread crests and flanks and the thread form is round. Preferably, the latter temperature is no greater than about 230° F. and is in a temperature range preferably between about 190° F. and 220° F. The coolant, in reducing the temperature to the latter range, completely vaporizes such that the metal chips resulting from the threading operation are completely dry. A suitable coolant providing these results is obtainable from Fuchs Lubricants Co. of Harvey, Ill. under the latter's product designation SBH8 105A. The latter is a glycol based coolant which is oil free and contains 4% or less of a lubricant which is synthetic. In connection with threading galvanized or steel pipe of a diameter from ½" to 1", a workpiece temperature of between 190° F. and 220° F. is maintained during a thread cutting operation with the dispensing of the coolant onto the workpiece adjacent the point of contact of one of the cutting dies therewith at a rate of from one to two drops per second.

Figure 3:
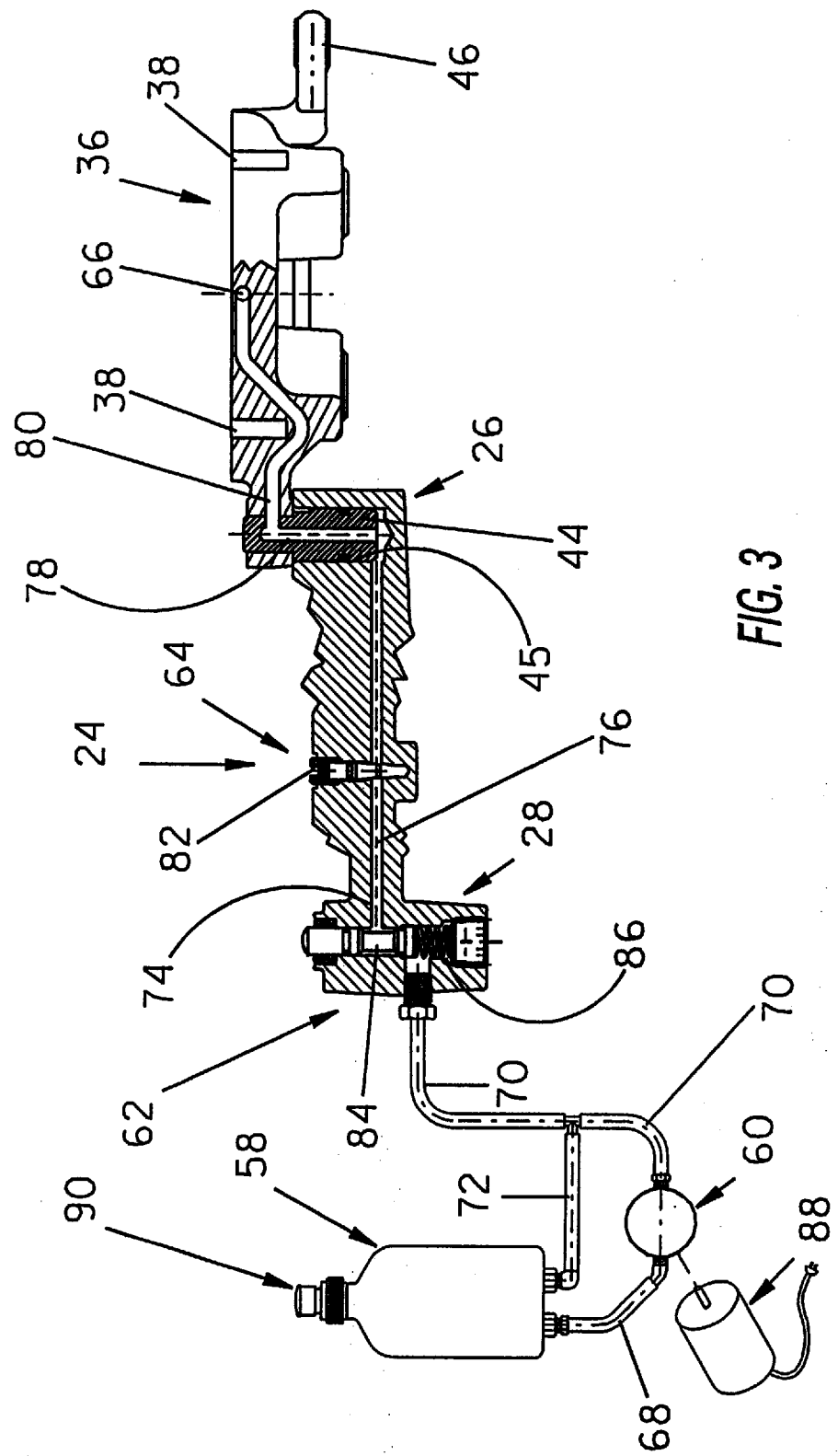
FIG. 3 is a schematic illustration of the coolant supply and dispensing system.

It will be appreciated that the dispensing of the coolant onto the workpiece and tooling can be achieved in any one of a number of different ways including, for example, the manual dispensing from a container having a squeezable or other drop dispensing capability, or by gravity flow from a container across a flow control valve which is opened and closed by the machine operator to control the dispensing rate. Preferably, however, the dispensing is coordinated with operation of the threading machine and controlled in a manner which optimizes the economic use and consumption of the volatile coolant. A preferred arrangement for the coolant system and the control of the dispensing of coolant onto a workpiece during a threading operation is schematically illustrated in FIG. 3 and is shown in detail in FIGS. 1, 2 and 4–7 with respect to its incorporation in the thread cutting machine described hereinabove. With reference to these figures, the coolant system includes a coolant reservoir 58, a coolant pump 60, a normally closed shut-off valve 62, and a flow restricting needle valve 64 and a coolant outlet 66. Pump 60 has an inlet connected to reservoir 58 by a line 68 and an outlet connected to valve 62 by a line 70. Line 70 is connected back to reservoir 58 by a bypass line 72 whereby, when pump 60 is operating and valve 62 is closed the pumped coolant is returned to the reservoir. The outlet side of valve 62 is connected to coolant outlet 66 by a passageway 74 in side 28, a passageway 76 in cross member 32 and side 26 of carriage 24, the inner end of pin bore 45, a passageway 78 in pin 44 and a passageway 80 in die head 36. Needle valve 64 is in the portion of passageway 74 in cross member 32 and includes a manually displaceable operating member 82 by which the restriction through passageway 74 and thus the drip rate of coolant through coolant outlet 66 can be controlled. As described in greater detail hereinafter, shutoff valve 62 includes a spindle 84 which is biased to close the valve by a compression spring 86 and, preferably, is displaced by positioning lug 46 on the die head to open the valve. Pump 60 is driven in a well known manner by the threading machine motor 88 through a transmission arrangement, not shown. Assuming motor 88 to be turned on so as to drive chuck assembly 16 as described hereinabove, coolant is initially pumped through lines 68 and 70 and back to reservoir 58 through line 72 until such time as shut-off valve 62 opens. When valve 62 opens the coolant is pumped through the shut-off valve and across needle valve 64 to outlet 66 and thence onto the workpiece being threaded. Preferably, as shown in FIG. 7, coolant outlet 66 is positioned for the droplets of coolant to be dispensed on the downstream side of the cutting die immediately upstream from the top vertical center point of the die head, the downstream side being with respect to the direction of rotation of workpiece W which is counterclockwise in FIG. 7.

Figure 5:
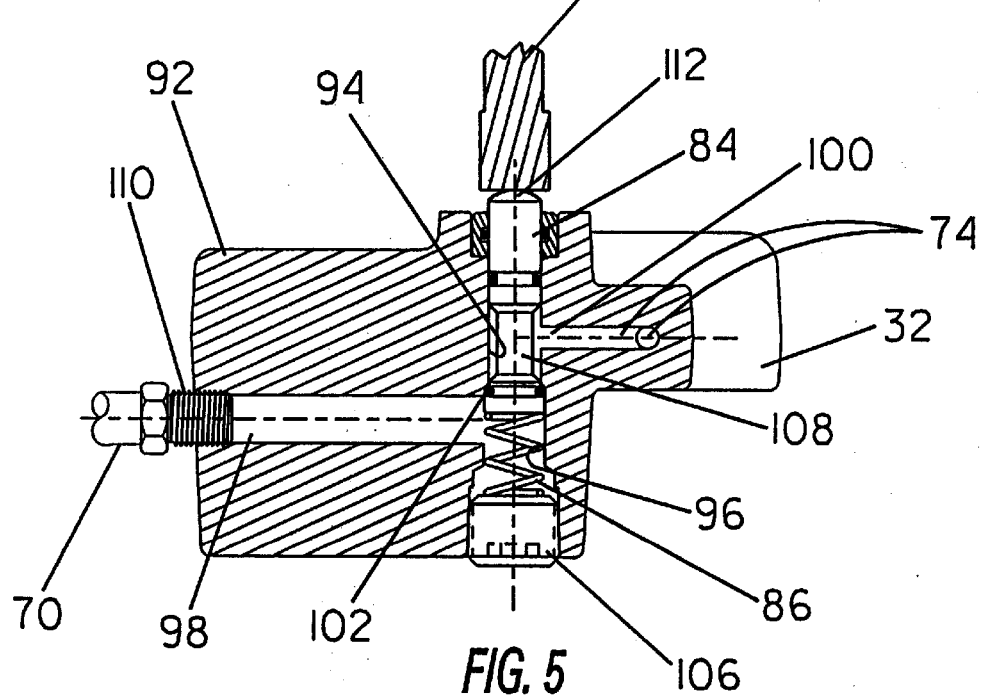
FIG. 5 is a sectional elevation view taken along line 5—5 in FIG. 2 and showing the shut-off valve closed as in FIG. 4.
Figure 6:
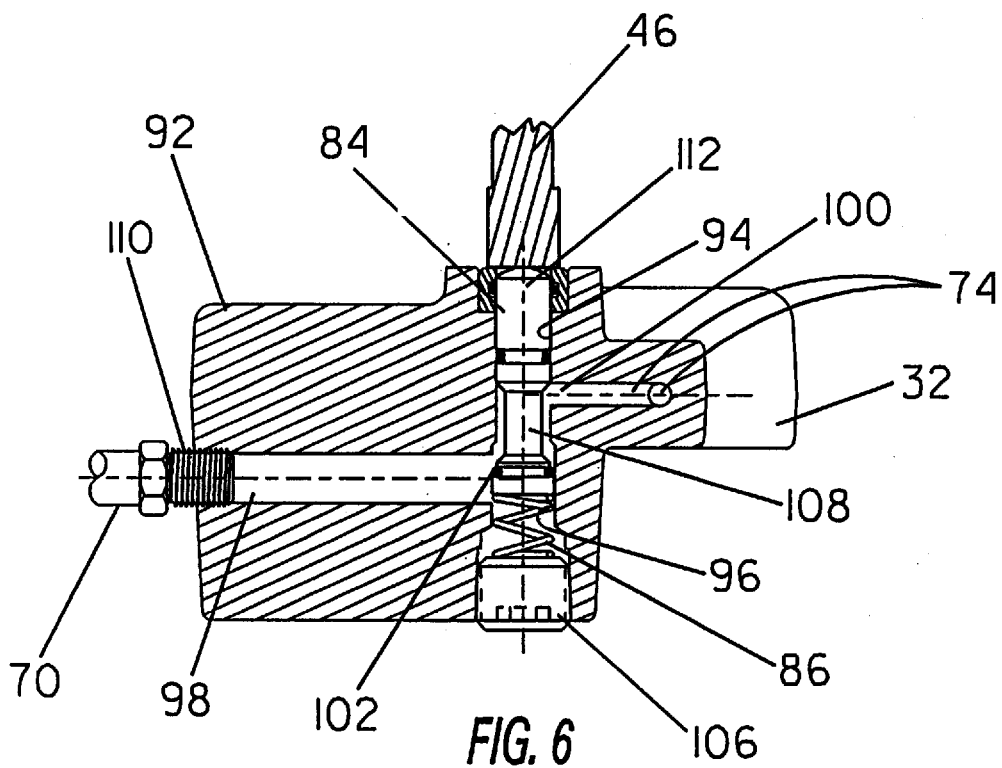
FIG. 6 is a sectional elevation view similar to FIG. 5 and showing the shut-off valve in the open position thereof during a thread cutting operation; and, FIG. 7 is a front elevation view of the die head showing the coolant passageway therethrough.
Figure 7:
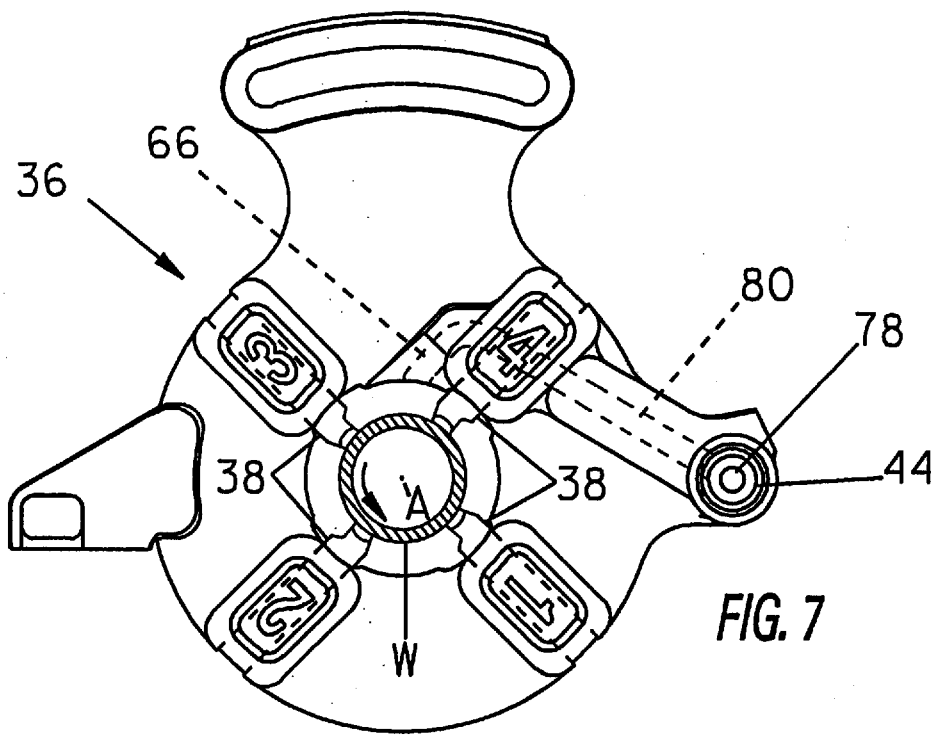

The coolant system as described above is incorporated in the threading machine as shown in FIGS. 1, 2 and 4–7. In this respect, reservoir 58 is preferably in the form of a receptacle such as a plastic bottle having a removable vented cap 90 at the upper end thereof for replenishing the coolant supply in the reservoir. Reservoir 58 is conveniently located in spindle, motor and transmission housing portion 12 of the machine base with cap 90 accessible at the top of the housing as shown in FIGS. 1 and 2. It will be appreciated that motor 88 and the pump transmission are located within housing 12 and that pump 60 is suitably supported therein so as to be driven thereby. Line 68 to the inlet side of pump 60, the portion of line 70 connected to return line 72 and the latter return line are also located within housing 12. Preferably, shut-off valve 62 is mounted on side 28 of carriage 24 in a position to be operated by positioning lug 46 on die head 36 as described hereinafter. More particularly in this respect, as best seen in FIGS. 4–6, side 28 of the carriage includes a portion 92 extending laterally inwardly of projections 50 and provided with a vertical bore having an upper portion 94 and a lower portion 96, a coolant inlet passage 93 opening laterally into lower portion 96 and a coolant outlet passage 100 opening laterally into upper portion 94 of the bore. Lower portion 96 of the bore is of a larger diameter than upper portion 94, whereby a valve seat 102 is provided in the bore axially between inlet and outlet passages 98 and 100. Valve spindle 84 is axially slidably received in the bore and has an inner end provided with a valve element in the form of an O-ring seal 104 for engaging seat 102 to shut off communication between the inlet and outlet passages. The lower end of the vertical bore is closed by a plug member 106, and compression spring 86 is located in lower bore portion 96 between plug member 106 and the inner end of spindle 84 to bias valve element 104 against seat 102 to close the valve. Spindle 84 is provided with a radially inwardly and axially extending peripheral recess 108 on the downstream side of valve element 104 for communicating inlet and outlet passages 98 and 100 when the valve is open. Coolant flow line 70 from pump 60 is connected to inlet passage 98 by a suitable coupling 110, and outlet passage 100 provides the inlet end of passageway 74 described hereinabove.

When valve 62 is closed, the axially upper or outer end 112 of spindle 84 extends above surface 52 for the purpose set forth hereinafter and, as will be appreciated from FIGS. 4–6, an axially inward force against outer end 112 of spindle 84 displaces valve element 104 away from valve seat 102 to open the valve against the bias of spring 86. In the open position, coolant flows from inlet passage 98 to outlet passage 100 across valve seat 102 and recess 108 in spindle 84. The manner in which spindle 84 is displaced to open the shut-off valve will be described in greater detail hereinafter, but it will be noted at this point that when die head 36 is initially displaced to its use position shown in FIG. 2 in which positioning lug 46 is located in positioning lug slot 48, underside 56 of the positioning lug engages against outer end 112 of spindle 84 as shown in FIGS. 4 and 5 of the drawing, and the force of compression spring 86 alone is sufficient to bias spindle 84 to its closed position against the weight of the die head imposed thereon through positioning lug 46.

As will be appreciated from FIGS. 1 and 2 and the foregoing description, when a workpiece W is to be threaded the machine operator inserts the workpiece in chuck assembly 16 and pivots die head 36 from its non-use or storage position shown in FIG. 1 to the use position shown in FIG. 2 which is a preliminary working position in which positioning lug 46 is received in positioning slot 48 and rests on end 112 of valve spindle 84 as shown in FIGS. 4 and 5. In the preliminary working position, axis B of die head 36 basically coincides with machine axis A. At this time, carriage 24 is positioned for thread cutting dies 38 to be axially outwardly spaced from the end of workpiece W to be threaded, and compression spring 86 maintains spindle 84 in its upper position whereby shut-off valve 62 is closed. Presuming the machine to be turned on and positioning lever 42 to have been manipulated to radially position the cutting dies in their cutting positions, the operator turns carriage operating handle 34 to move carriage 24 and thus die head 36 toward workpiece W to initiate the threading operation. The workpiece is rotated counterclockwise in FIG. 2 and, immediately upon engagement of cutting dies 38 with the workpiece, torque is imposed on the cutting dies and die head 36 whereby the die head is pivoted counterclockwise in FIG. 2. This causes positioning lug 46 to depress valve spindle 84 against the bias of spring 86 to open shut-off valve 62, as shown in FIG. 6. In this position of the die head, underside 56 of the positioning lug engages bottom 52 of positioning slot 48 and provides the working position of the die head. When valve 62 opens, coolant is pumped from reservoir 58 across needle valve 64 to coolant outlet 66 and is dispensed therefrom onto the workpiece at a rate set by and adjustable through manipulation of operating member 82 of needle valve 64. Engagement of cutting dies 38 with the workpiece generates the thread cutting temperature which, as described herein is reduced to the desired range of from 190° F. to 220° F. by the coolant which completely evaporates upon contact with the hot workpiece. As a result of the restricted flow through needle valve 64, a certain amount of the coolant may be recirculated through line 72 back to reservoir 58 during the threading operation.

When the threading operation has been completed, the operator manipulates lever 42 to release the cutting dies which immediately recede radially outwardly into the die head. Immediately in response to separation of the cutting dies from the workpiece, compression spring 86 displaces valve spindle 84 upwardly to close valve 62 and shut off the coolant flow to outlet 66. Preferably, and as will be appreciated from FIGS. 1 and 2, an open top container or tray 114 is removably supported on the bottom of tooling carriage support portion 14 of base 10 in underlying relationship with respect to the work area, whereby metal chips removed from the workpiece during a threading operation fall into the container. As will be appreciated from the description herein, the coolant evaporates completely upon contacting the hot workpiece, whereby the metal chips that fall into the container are dry. Therefore, when it desired or becomes necessary to clean the machine it is only necessary to remove container 114 and dump the dry chips therefrom. There is no oil or other residue in the container or on the machine, whereby any chips which cling to the receptacle or machine are easily removed such as by brushing or the like. Further, the coolant is preferably water soluble, whereby any residue therefrom is easily washed away and the parts wiped dry. In any event, there is no oily residue or film to which chips, dirt and the like can cling and which would require the use of a solvent in connection with the removal thereof.

While considerable emphasis has been placed herein on the structures and structural interrelationships between the component parts of a preferred embodiment of the invention, it will be appreciated that other embodiments can be devised and that changes can be made in the preferred embodiment without departing from the principals of the invention. In particular, it will be appreciated that the shut-off valve, needle valve and coolant outlet can be associated with a flexible flow line extending from the pump and manually displaceable by the machine operator who would manually open and close the shut-off valve respectively at the beginning and end of a thread cutting operation. Further, the shut-off and/or needle valve could be separate from and mounted on the carriage instead of being built thereinto, and the valve or valves connected to the reservoir and dispensing outlet through the use of tubing rather than passages in the machine carriage and die head. Still further, when the shut-off valve is built in as disclosed herein, the biasing spring for holding the die head in the preliminary working position could be separate from the valve and directly in engagement with the die head positioning lug. Moreover, other torque responsive arrangements can be provided for controlling the flow of coolant from the reservoir to the coolant outlet, and metering of the rate of discharge of coolant from the nozzle can be controlled other than through the use of a needle valve, and can be controlled through the use of a pre-adjusted metering valve incorporated in the machine so as to restrict access thereto. These and other changes as well as other embodiments of the invention will be suggested or obvious to those skilled in the art from the disclosure herein, whereby it is to be distinctly understood that the foregoing descriptive matter is to be interpreted merely illustrative of the present invention and not as a limitation.

Having thus described the invention, it is claimed:

1. A method of cooling a workpiece during a thread cutting operation comprising, providing an oil free liquid coolant which will vaporize at a frictional temperature of a workpiece which is generated by relative rotational thread cutting interengagement between a workpiece and thread cutting tool means, moving a thread cutting tool and workpiece in thread cutting interengagement to generate said frictional temperature, and dispensing said coolant onto said workpiece at a rate for said coolant to completely evaporate and cool the workpiece to a temperature no greater than 230° F.

2. The method according to claim 1, wherein said dispensing of said coolant is at a rate of from one to two drops of coolant per second.

3. The method according to claim 1, wherein said frictional temperature is greater than 230° F.

4. The method according to claim 1, wherein said cooling of said workpiece is to a temperature between 190° F. and 220° F.

5. The method according to claim 1, and initially relatively moving said thread cutting tool means into contact with said workpiece to provide said thread cutting interengagement, and initiating said dispensing at the time of such contact.

6. The method according to claim 5, wherein said dispensing of said coolant is at a rate of from one to two drops of coolant per second.

7. The method according to claim 6, wherein said frictional temperature is greater than 230° F. and said cooling of said workpiece is to a temperature between 190° F. and 220° F.

8. In a power driven threading machine comprising a chuck for supporting a workpiece to be threaded for rotation about a machine axis, means for rotating said chuck means about said axis, a thread cutting die head having a plurality of thread cutting dies for cutting threads on an end of said workpiece, means supporting said die head for displacement relative to said end of said workpiece between first and second positions in which said cutting dies are respectively spaced from and in thread cutting engagement with said end, and means for dispensing coolant onto said end during the cutting of threads thereon, the improvement comprising: said means for dispensing coolant comprising means for dispensing said coolant onto said end in discrete drops when said die head is in said second position.

9. The improvement according to claim 8, wherein said means for dispensing further includes means for adjusting the rate of dispensing of said discrete drops.

10. The improvement according to claim 8, wherein said means for dispensing further includes means for initiating said dispensing in response to movement of said die head from said first to said second position.

11. The improvement according to claim 8, wherein said means for dispensing includes means for initiating said dispensing in response to movement of said die head into cutting engagement with said end of said workpiece.

12. The improvement according to claim 8, wherein said means for dispensing coolant includes a source of coolant, a flow line having an outlet for directing coolant onto said end of said workpiece, means for pumping coolant from said source through said flow line to said outlet, and means for controlling the flow of coolant through said flow line to said outlet.

13. The improvement according to claim 12, wherein said means for controlling the flow of coolant through said flow line includes a valve for controlling the rate of dispensing of said discrete drops.

14. The improvement according to claim 12, wherein said means for controlling the flow of coolant through said flow line includes a valve for precluding flow to said outlet when said die head is in said first position.

15. The improvement according to claim 14, wherein said valve is between said source and said outlet and has open and closed positions when said die head is respectively in said second and first positions, and means between said source and said valve for recirculating coolant to said source when said valve is in said closed position thereof.

16. The improvement according to claim 12, wherein said means for controlling the flow through said flow line includes a first valve for precluding flow to said outlet when said die head is in said first position, and a second valve for controlling the rate of dispensing of said discrete drops when said die head is in said second position.

17. The improvement according to claim 16, wherein said second valve is adjustable for adjusting the rate of dispensing.

18. The improvement according to claim 17, and means between said source and said first valve for recirculating coolant to said source when said die head is in said first position.

19. A power driven threading machine comprising a chuck for supporting a workpiece to be threaded for rotation about a machine axis, drive means for rotating said chuck about said axis, a thread cutting die head having a plurality of thread cutting dies for cutting threads on an end of said workpiece, a carriage supporting said die head, said carriage being displacable relative to said end of said workpiece between first and second carriage positions in which said cutting dies are respectively axially spaced from and in thread cutting engagement with said end, a coolant reservoir, coolant flow line means having an inlet end connected to said reservoir and an outlet end for dispensing coolant onto said end of said workpiece, a pump for pumping coolant from said reservoir through said flow line means to said outlet end thereof, a flow control valve between said pump and said outlet end having open and closed conditions respectively allowing and precluding flow from said reservoir to said outlet end, said valve being in said closed condition when said die head is in said first position, and means for shifting said flow control valve to said open condition in response to movement of said carriage means from said first to said second position.

20. The threading machine according to claim 19, wherein a torque is imposed on said cutting dies and said die head when said carriage is in said second position, said means for shifting said flow control valve means to said open condition including means responsive to said torque.

21. The threading machine according to claim 20, wherein said die head is pivotal about an axis parallel to said machine axis between a preliminary working position and a working position, said die head being in said preliminary working position when said carriage is in said first position, said die head being pivotal from said preliminary working position to said working position when said carriage moves from said first position into said second position, and said means for shifting said flow control valve including means on said die head for shifting said valve to said open condition in response to pivotal displacement of said die head to said working position.

22. The threading machine according to claim 21, and means for shifting said flow control valve from said open condition to said closed condition when said carriage is in said first position.

23. The threading machine according to claim 22, wherein said means for shifting said flow control valve to said closed condition includes means for biasing said die head from said working position to said preliminary working position when said carriage is in said first position.

24. The threading machine according to claim 19, and a flow restricting valve in said flow line means for controlling the rate of flow of coolant onto said end of said workpiece.

25. The threading machine according to claim 24, wherein said flow restricting valve is adjustable.

26. The threading machine according to claim 19, wherein said flow line means includes a flow line between said reservoir and said flow control valve for recirculating coolant to said reservoir when said flow control valve is in said closed condition.

27. The threading machine according to claim 19, wherein said die head includes said means for shifting said flow control valve to said open condition.

28. The threading machine according to claim 27, wherein said die head has an axis parallel to said machine axis and laterally opposite sides with respect to said machine axis, a pin supporting said die head on said carriage for pivotal displacement relative thereto about a pivot axis on one of said sides and parallel to said machine axis, said die head being pivotal about said pivot axis between a preliminary working position in which said die head axis is laterally adjacent and parallel to said machine axis and a working position in which said die head axis is coaxial with said machine axis, and said flow control valve being in said open condition when said die head is in said working position.

29. The threading machine according to claim 28, and a spring for biasing said flow control valve from said open condition to said closed condition and said die head from said working position to said preliminary working position when said carriage is in said first position.

30. The threading machine according to claim 29, wherein a torque is imposed on said cutting dies and said die head when said carriage is in said second position, said torque pivoting said die head from said preliminary working position to said working position.

31. The threading machine according to claim 30, wherein said carriage has laterally opposite sides, said pivot axis of said die head being on one of said sides of said carriage, said flow control valve being on the other of said opposite sides of said carriage, said means on said die head for shifting said flow control valve being on the other of said opposite sides of said die head for shifting said flow control valve to said open condition when said carriage is in said second position and said torque pivots said die head to said working position.

32. The threading machine according to claim 31, wherein said flow control valve includes a displacable valve actuator having actuated and unactuated positions in which said flow control valve is respectively in said open and closed conditions, said means on said die head for shifting said valve being positioned to displace said actuator from said unactuated to said actuated position in response to pivoting of said die head from said preliminary working position to said working position.

33. The threading machine according to claim 32, wherein said spring for biasing said flow control valve and said die head includes a spring biasing said actuator toward said unactuated position.

34. The threading machine according to claim 33, wherein said flow control valve includes a bore in said other side of said carriage having inner and outer ends, a valve spindle in said bore and reciprocable in the direction between said inner and outer ends, said spindle having an outer end extending outwardly of said outer end of said bore in said unactuated position and providing said valve actuator.

35. The threading machine according to claim 34, wherein said spring is in said bore between said spindle and said inner end of said bore.

36. The threading machine according to claim 35, and a flow restricting valve in said coolant flow line means for controlling the rate of flow of coolant onto said end of said workpiece.

37. The threading machine according to claim 36, wherein said flow restricting valve is an adjustable needle valve.

* * * * *